Figure 1A:
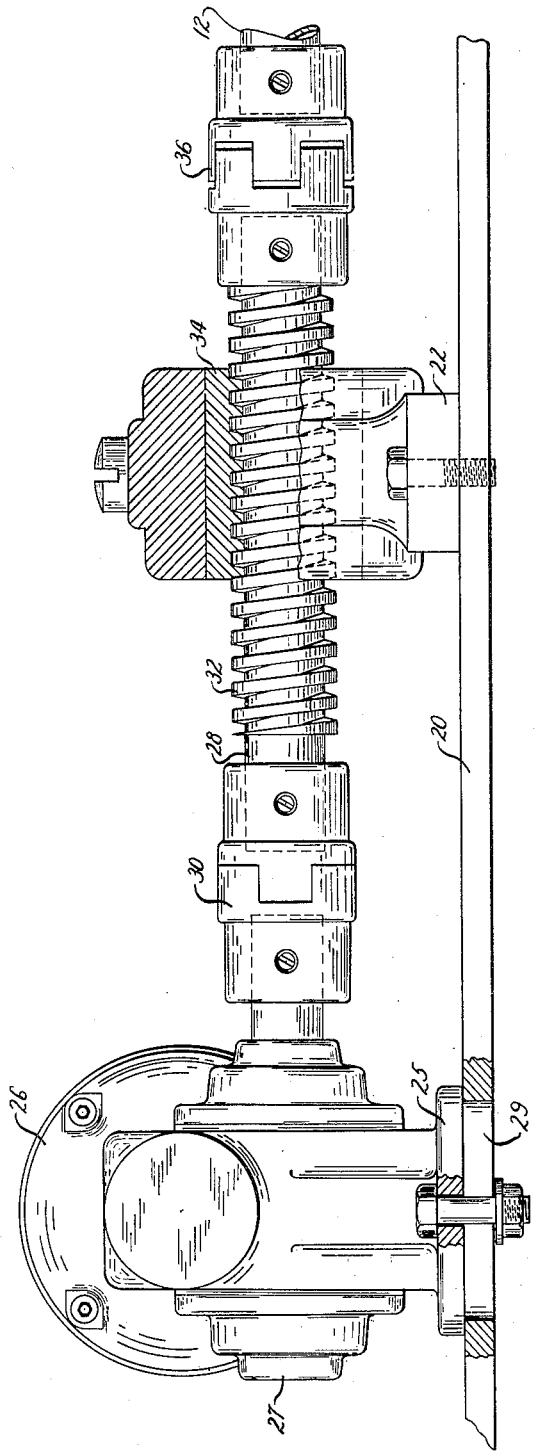

May 8, 1951 J. W. PEARCE 2,551,631
METHOD OF MAKING SUCTION CLEANER HOSE
Filed Nov. 22, 1947 2 Sheets-Sheet 1

INVENTOR.
John W. Pearce
BY Harry S. Dunaser
ATTORNEY.

May 8, 1951  J. W. PEARCE  2,551,631
METHOD OF MAKING SUCTION CLEANER HOSE
Filed Nov. 22, 1947  2 Sheets—Sheet 2

INVENTOR.
John W. Pearce
BY
Harry S. Ducasse
ATTORNEY.

Patented May 8, 1951

2,551,631

UNITED STATES PATENT OFFICE 2,551,631

METHOD OF MAKING SUCTION CLEANER HOSE

John W. Pearce, North Canton, Ohio, assignor to The Hoover Company, North Canton, Ohio, a corporation of Ohio Application November 22, 1947, Serial No. 787,516

6 Claims. (Cl. 154—8)

This invention relates to a suction cleaner hose and more particularly to the method of and apparatus for making the same.

Hose for suction cleaners must be very flexible for ease in manipulating the hand tools. It must be quite strong to compressive stresses diametrically of the hose so as to prevent collapse and rupture when accidentally trod upon by the operator of the suction cleaner.

It is known to make a hose with a helically coiled reinforcing wire in its walls. When the reinforcing wire is vulcanized in situ or otherwise embedded in the walls of the hose, the wire has no freedom of movement and as a result the hose is too rigid for use with suction cleaners. When the reinforcing wire is left free, that is, the covering is not adhered to the liner, repeated use of the hose has shown that the hose deteriorates quite rapidly because of relative movement between the cover and liner.

According to the broadest aspects of this invention, a helically coiled reinforcing wire is positioned between a cover and liner of thermoplastic material and the cover and liner are helically heat-sealed to each other between the convolutions of the helically coiled reinforcing wire. This allows for freedom of movement of the walls of the wire and prevents relative movement of the cover and liner.

Heat-sealing of thermoplastics is accomplished by the application of heat and pressure to the area to be sealed. When the heat is applied externally the thermoplastic material becomes plastic on the outside before sufficient heat is transmitted interiorly to the surface to be sealed, with the result that the thermoplastic material may adhere to the mandrel or pressure applying means rather than be sealed interiorly as desired.

According to the present invention the heat is applied interiorly of the materials at the surfaces which are to be sealed together. This is done by making the mandrel, upon which the liner is placed, one electrode of an electrical high frequency generator and the pressure applying means the other electrode. The mandrel is then rotated and simultaneously advanced axially of its length so that the resulting pitch of the path traversed by the heat-sealing means will be the same as that of the convolutions of the spirally wound wire. Simultaneously the pressure applying means is applied medially of the convolutions of the helically wound wire so that a helical heat-seal is formed between the liner and cover medially between the convolutions of the wire. Preferably a plurality of pressure applying means are spaced axially of the mandrel so that only a few turns of the mandrel is necessary to apply the helical seam for the entire length of the hose.

The two electrodes then act as the plates of a condenser and the layers of thermoplastic material as the dielectric. The high frequency electrical field set up in the thermoplastic material rapidly heats it to its plastic condition at the surfaces to be sealed so that the heat does not have to be transmitted through the material from the exterior.

According to another feature of this invention additional thermoplastic material or other fabric is wound about the reinforcing wire between the wire and the thermoplastic cover at the ends of the hose to reinforce the hose at the ends where the fittings are to be attached. The application of dielectric heat will then cause the inner surface of the cover of thermoplastic material and the outer surface of the liner of thermoplastic material to adhere to the reinforcing fabric and bond all three layers together.

More specifically according to this invention, an inner liner of thermoplastic material is applied to a mandrel in any suitable manner. The wire is then wound helically over the liner with the convolutions thereof spaced axially along the length of the mandrel. Reinforcements of frictioned fabric or thermoplastic material is then wound over the wire and mandrel adjacent each end. A thermoplastic covering is then applied over the hose carcass thus formed in any suitable manner. The mandrel with the thermoplastic liner and cover the intermediate helically coiled reinforcing wire and the end reinforcements thereon is then simultaneously rotated and moved axially while a high frequency electric field is applied spirally between the convolutions of the reinforcing wire so as to heat-seal the liner and cover to each other at their contacting surfaces between the reinforcements at the ends and to seal the liner and cover to the reinforcement at the ends.

Figure 1B:
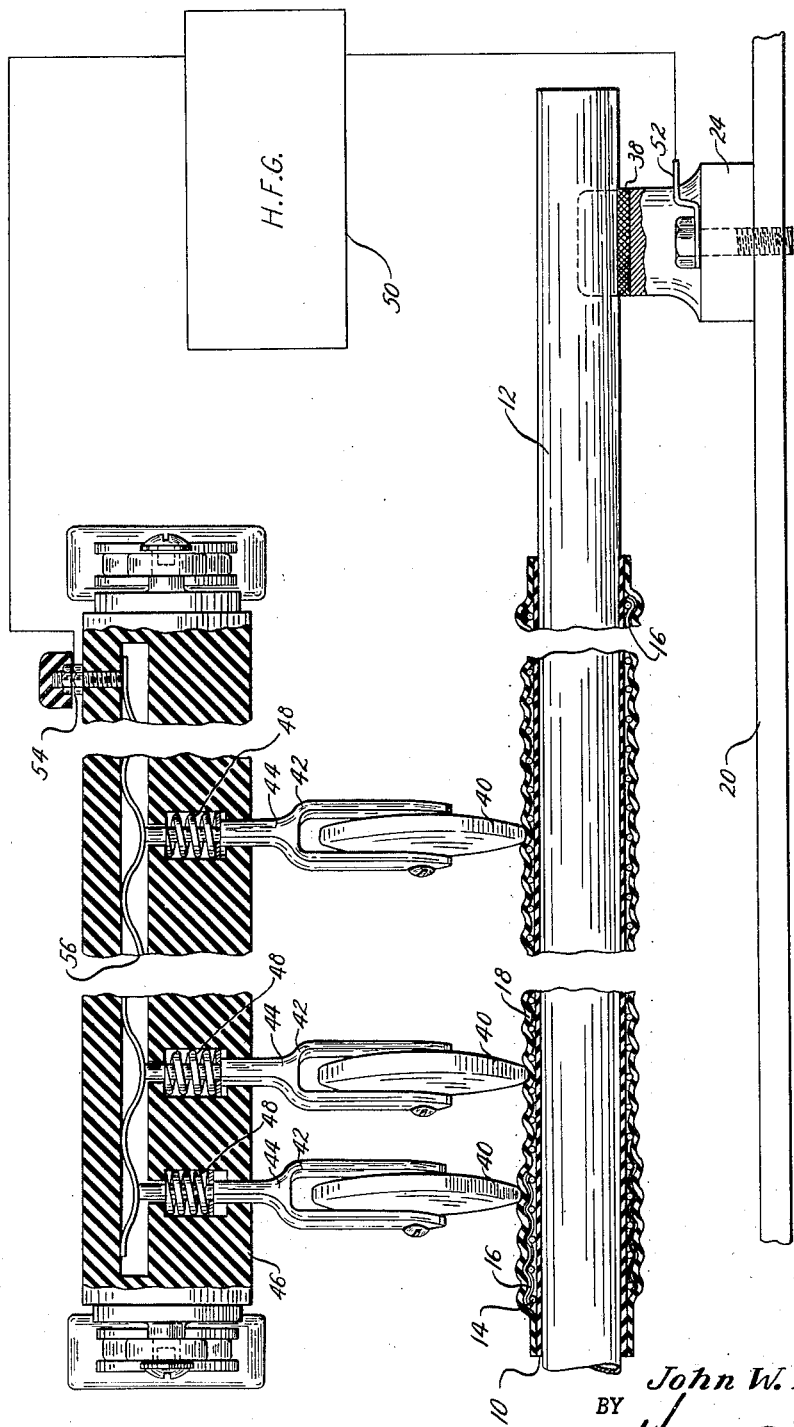

Other objects and advantages of this invention will become apparent as the description proceeds when taken in connection with the accompanying drawings in which:

Figure 1a shows the portion of the apparatus for carrying out the process of this invention in which the mandrel upon which the hose is to be formed is simultaneously rotated and advanced axially of its length; and Figure 1b shows the portion of the apparatus which applies a helical heat seal to the cover and liner between the convolutions of the reinforcing wire.

Referring to the drawings, the reference numeral 10 represents a thermoplastic hose liner of polyvinyl chloride or other suitable thermoplastic. The liner 10 is applied to a mandrel 12 in any suitable manner such as by inflating with air and drawing the liner over the mandrel in a manner well known in the art.

A reinforcing wire 14 is then wound spirally over the liner 10 in any suitable manner such as by placing the mandrel 12 with the liner 10 thereon in a lathe and rotating the mandrel 12 while advancing the reinforcing wire axially of the mandrel 12. The ends of the wire 14 are secured to the liner 10 in any suitable manner such as by the application of frictioned tape. It is to be noted from the drawings that the wire 14 does not extend to the ends of the liner 10, but a short length of the liner, about three-quarters of an inch is left unwound. It has been found that for a suction cleaner hose the pitch of the helix of the wire should be about one-half inch.

A reinforcing layer 16 is then wound over the ends of the helically wound wire to reinforce the hose at the ends where the fittings are to be attached. This may be done while the mandrel is being rotated in the lathe.

A cover 18 of thermoplastic material similar to the liner 10 is then applied over the wire 14 and the reinforcement 16 in any suitable manner such as by inflating and pulling it over the assembly.

The cover 18 should be of the same length as the liner 10. This will form a hose carcass comprising the liner 10 and cover 18 in contact with each other at the ends; liner 10, wire 14, reinforcements 16 and cover 18 adjacent the ends of the hose and liner 10, wire 14 and cover 18 forming the body of the hose between the reinforcements 16.

The hose carcass thus formed is then placed in the machine shown in the drawings. This machine comprises a bed plate 20 similar to the bed plate of a metal turning lathe. Mounted on the bed plate 20 are three pedestals 22, 24, and 25. The pedestal 25 carries a driving motor 26 and reduction gearing 27. The gearing 27 drives a shaft 28 by means of a suitable coupling 30. The pedestal 25 carrying the motor 26 and reduction gearing 27 is adapted to move longitudinally of the bed plate 20 by means of a bolt and slot connection 29. The shaft 28 is threaded as at 32 to cooperate with a nut 34 carried by the pedestal 22. The pitch of the thread 32 is the same as that of the convolutions of the helically wound wire 14. The shaft 28 has a coupling 36 adapted to be connected to one end of the mandrel 12. The opposite end of the mandrel is supported in a bearing 38 carried by the pedestal 24.

Mounted over the mandrel 12 are pressure applying means in the form of a plurality of rollers 40. The rollers 40 are rotatably mounted in U-shaped brackets 42 supported by stems 44 from a supporting member 46. A plurality of springs 48 apply downward pressure to the rollers 40.

The rollers 40 are preferably spaced apart a distance equal to four times the pitch of the convolutions of the helically wound wire 14.

A high frequency generator 50 of any suitable nature is connected by one lead 52 to the pedestal 24 and by a second lead 54 to the support 46 for the rollers 40. The lead 54 is connected by a conductor 56 to the stems 44 of the brackets 42 which carry the rollers 40. This will make the mandrel 12 one electrode of the high frequency generator 50 and the rollers 40 the other.

The mandrel 12 carrying the liner 10, wire 14, reinforcements 16 and cover 18 is then placed in the machine with one end attached to the coupling 36 and the other resting in the bearing 38. The support 46 is then moved into position so that the rollers 40 will apply pressure to the cover 18 medially of the convolutions of the wire 14. At the ends this will press the cover 18 against the reinforcing layer 16 and the reinforcing layer 16 against the liner 10 medially of the convolutions of the wire 14. Between the reinforcements 16 the cover 18 will be pressed against the liner 10 medially of the convolutions of the wire 14.

The high frequency generator 50 and the motor 26 will then be simultaneously energized. This will cause the mandrel 12 to rotate and advance axially so that the rollers 40 will traverse a spiral path medially of the convolutions of the wire 14. The mandrel 12 and the rollers 40 will form the condensers and the layers 10, 16, and 18 the dielectric. The high frequency field thus produced in the layers 10, 16, and 18 will heat those layers at their contacting surfaces so as to render the layers 10 and 18 plastic. The pressure applied by the springs 48 will cause the plastic layers 10 and 18 to adhere to each other between the reinforcements 16 and to adhere to the reinforcement 16 at the ends. As a result a helical seam will be formed medially of the convolutions of the wire 14 between the layers 10, 16, and 18.

The heat transmitting properties of the mandrel 12 and the rollers 40 will carry away the heat from the inner surface of the liner 10 and from the outer surface of the cover 18 so that the liner 10 and cover 18 will become plastic only where they contact each other and the reinforcement 16.

This will form a hose having a thermoplastic liner and a thermoplastic cover with a helically wound wire lying between them and having a helical heat-seal between the liner and cover medially of the wire convolutions. The ends of the hose will be reinforced by reinforcements 16, heat-sealed to both the cover and liner medially of the wire convolutions.

The hose thus formed will be removed from the mandrel 12 in any suitable manner and the free ends of the liner 10 and cover 18 beyond the helically coiled wire 14 may then be tucked inside the hose to form additional reinforcements before the fittings are attached.

From the foregoing it can be seen that this invention comprises a method and apparatus for heat-sealing a cover to the liner of a hose medially of the convolutions of its helical reinforcing wire to form the body of the hose and to heat-seal the liner and cover to the reinforcing layers at the ends also medially of the helical reinforcing wire.

The hose thus formed has the liner and cover secured to each other to prevent abrasion while allowing freedom of movement of the helically wound wire so as to render the hose more flexible.

While I have shown but a single modification of this invention it is to be understood that this modification is to be taken as illustrative only and not in a limiting sense. I do not wish to be limited to the particular apparatus and method shown and described but to include all equivalent variations thereof except as limited by the scope of the claims.

I claim:

1. The method of making a flexible corrugated hose consisting of a thin thermoplastic tubular liner, a thin thermoplastic tubular cover and a helically wound reinforcing wire lying between said cover and liner comprising, rotating and simultaneously advancing said hose axially while heating said cover and liner solely medially of the convolutions of said wire to spirally heat-seal said liner and cover to each other medially of the convolutions of said wire so as to form a hose comprising inner and outer tubes of thin thermoplastic material heat sealed to each other medially of the convolutions of a spirally wound wire lying between said tubes.

2. The method of making a flexible corrugated hose consisting of a thin thermoplastic tubular liner, a thin thermoplastic tubular cover and a helically wound reinforcing wire lying between said cover and liner comprising, rotating and simultaneously advancing said hose axially while applying a high frequency electric field to said liner and cover medially of the wire convolutions so as to heat-seal said liner to said cover medially of the wire convolutions so as to form a hose comprising inner and outer tubes of thin thermoplastic material heat sealed to each other medially of the convolutions of a spirally wound wire lying between said tubes.

3. The method of making a flexible corrugated hose consisting of a thin thermoplastic tubular liner, a thin thermoplastic tubular cover and a helically wound reinforcing wire lying between said cover and liner comprising, heating said liner and cover at a plurality of points spaced axially of said hose between the convolutions of said wire while simultaneously rotating said hose and advancing it axially a distance equal to the distance between said spaced points so as to form a hose comprising flexible inner and outer tubes of thin thermoplastic material heat sealed to each other medially of the convolutions of a spirally wound wire lying between said tubes.

4. The method of making a flexible corrugated hose comprising, applying a thin tubular liner of thermoplastic material to a mandrel, helically winding a reinforcing wire over said liner, applying a thin tubular cover of thermoplastic material over said wire, rotating said mandrel and simultaneously advancing it axially while applying a high frequency electric field to said cover and liner medially of the convolutons of said wire to spirally heat-seal said liner and cover to each other medially of the convolutions of said wire so as to form a hose comprising inner and outer tubes of thin thermoplastic material heat sealed to each other medially of the convolutions of a spirally wound wire lying between said tubes.

5. The method of making a hose comprising, applying a thin tubular liner of thermoplastic material to a mandrel, helically winding a reinforcing wire over said liner with its convolutions spaced axially of said mandrel, applying a reinforcing layer over said wire at the ends, applying a thin tubular thermoplastic cover over said wire and reinforcing layers, rotating said mandrel and simultaneously advancing it axially, simultaneously applying pressure applying means to said liner and cover medially of the convolutions of said wire and simultaneously applying a high frequency field to said mandrel and pressure applying means so as to dielectrically heat said cover and liner to heat-seal said cover to said liner between the reinforcing layers medially of the convolutions of said wire and to heat-seal said cover and liner to said reinforcing layers medially of the convolutions of said wire so as to form a hose comprising inner and outer tubes of thin thermoplastic material heat sealed to each other medially of the convolutions of a spirally wound wire lying between said tubes.

6. The method of making a hose comprising, applying a thin tubular thermoplastic liner to a mandrel, helically winding a reinforcing wire over said liner with its convolutions spaced axially of said mandrel, applying a thin thermoplastic cover over said reinforcing wire, rotating said mandrel while simultaneously advancing it axially at a rate equal to the pitch of the convolutions of said wire, simultaneously applying pressure applying means to said liner and cover at a plurality of points spaced axially of said mandrel medially of the convolutions of said wire, applying a high frequency electric field to said mandrel and pressure applying means so as to spirally heat-seal said cover to said liner in a continuous spiral path lying medially of the convolutions of said wire so as to form a hose comprising inner and outer tubes of thin thermoplastic material heat sealed to each other medially of the convolutions of a spirally wound wire lying between said tubes.

JOHN W. PEARCE.

REFERENCES CITED

The following references are of record in the file of this patent:

UNITED STATES PATENTS

| Number | Name | Date |
|---|---|---|
| 1,478,083 | Whitmarsh | Dec. 18, 1923 |
| 1,714,541 | Bergstein | May 28, 1929 |
| 2,273,027 | Dreyer | Feb. 17, 1942 |
| 2,366,037 | Chernack | Dec. 26, 1944 |
| 2,396,059 | Roberts | Mar. 5, 1946 |
| 2,430,081 | Roberts et al. | Nov. 4, 1947 |
| 2,433,067 | Russell | Dec. 23, 1947 |
| 2,438,498 | Geist et al. | Mar. 30, 1948 |
| 2,446,623 | Welch | Aug. 10, 1948 |
| 2,458,563 | Collins | Jan 11, 1949 |
| 2,491,048 | Jenkins | Dec. 13, 1949 |
| 2,504,500 | Collins | Apr. 18, 1950 |